(12) United States Patent
Crowell

(10) Patent No.: US 8,499,679 B1
(45) Date of Patent: Aug. 6, 2013

(54) SEISGUN

(75) Inventor: James Joshua Crowell, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 214 days.

(21) Appl. No.: 13/235,889

(22) Filed: Sep. 19, 2011

Related U.S. Application Data

(60) Provisional application No. 61/384,455, filed on Sep. 20, 2010.

(51) Int. Cl.
*F41A 23/34* (2006.01)
*G01V 1/09* (2006.01)

(52) U.S. Cl.
USPC .......................................... 89/40.13; 181/114

(58) Field of Classification Search
USPC .... 181/114, 121, 113, 116; 367/56; 89/40.13, 89/40.14
See application file for complete search history.

(56) References Cited

U.S. PATENT DOCUMENTS

| 4,223,759 A | 9/1980 | Martin |
| 4,324,310 A * | 4/1982 | Wener et al. ................. 181/116 |
| 4,334,591 A | 6/1982 | Martin |
| 4,354,572 A | 10/1982 | Martin |
| 4,359,131 A | 11/1982 | Martin |
| 4,418,786 A | 12/1983 | Martin |
| 4,867,266 A | 9/1989 | Martin |

OTHER PUBLICATIONS

Varsek and Lawton, The Seisgun—Part I: Field Tests, J. Canadian Soc. of Exploration Geophysicists, Dec. 1985, pp. 64-76, vol. 21, No. 1, CA.

* cited by examiner

*Primary Examiner* — Bret Hayes
*Assistant Examiner* — Reginald Tillman, Jr.
(74) *Attorney, Agent, or Firm* — Jason R. Jenkins

(57) ABSTRACT

A portable seisgun device providing a consistent signal for detection with sensor arrays and geophones in the course of seismic studies, and a self-contained transport mechanism. The device comprises a main platform, a muffling skirt and a gun stock mounted on a dolly. The platform provides a safe place to operate the device. The skirt both reduces noise and contains debris. The firing barrel fires a shotgun shell into the ground, producing the seismic signal. Interchangeable barrels permit different types of ammunition to be used. The dolly acts as both infrastructure and transport for the device and additional equipment, including over rough terrain.

13 Claims, 9 Drawing Sheets

SEISGUN

CROSS-REFERENCE TO RELATED APPLICATIONS

This application claims the benefit of U.S. Provisional Application No. 61/384,455, filed Sep. 20, 2010.

STATEMENT REGARDING FEDERALLY SPONSORED RESEARCH

Not Applicable

BACKGROUND OF THE INVENTION

1. Field of the Invention

Devices for generating a seismic impulse for study by geological scientists are known in the art. Most notably, a seismic shotgun ("seisgun") was introduced as a portable, inexpensive source for shallow refraction or reflection surveying. The present disclosure is directed to an improved seisgun that is increasingly mobile, self-contained, affordable, and easy to operate and maintain in a variety of field conditions.

2. Background Art

The Betsy™ seisgun (Betsy Seisgun Inc., Tulsa, Okla.) has for some three decades represented the state of the art with respect to seismic shotgun devices. The Betsy™, described in U.S. Pat. Nos. 4,223,759, 4,334,591, 4,354,572, and 4,418,786 to Martin, and by Varsek and Lawton (JOURNAL OF THE CANADIAN SOCIETY OF EXPLORATION GEOPHYSICISTS, 21:1, 1985), consists of a modified 21 mm (8 ga) industrial shotgun mounted vertically on a base muffle chamber. Slug cartridges are filed electrically and, as is well known in the art, the slug impacts the ground, perhaps in a bore hole of predetermined depth, resulting in a seismic pulse that is measurable using conventional detection means.

BRIEF SUMMARY OF THE INVENTION

Described herein is a portable seisgun device that safely provides a consistent seismic signal for detection with sensor arrays and geophones in the course of seismic studies, and also provides a transport mechanism for the geophone equipment, even over rough terrain. The device comprises a main platform, a muffling skirt and a gun stock mounted on a dolly. The skirt both reduces noise and contains debris; the platform provides a safe place to operate the device; and the firing barrel fires a shotgun shell into the ground, producing the seismic signal. The dolly acts as both infrastructure and transport for the device and additional equipment.

Safety is increased due to noise suppression and debris containment. Reliability is increased over existing devices. The device also allows for different penetration depths via the use of interchangeable firing barrels. The device is adapted to handle multiple gauges of ammunition for getting signals to different depths by utilizing interchangeable barrels, but when firing each gauge of shells it will produce a consistent result.

DETAILED DESCRIPTION OF THE INVENTION

Figure 1:
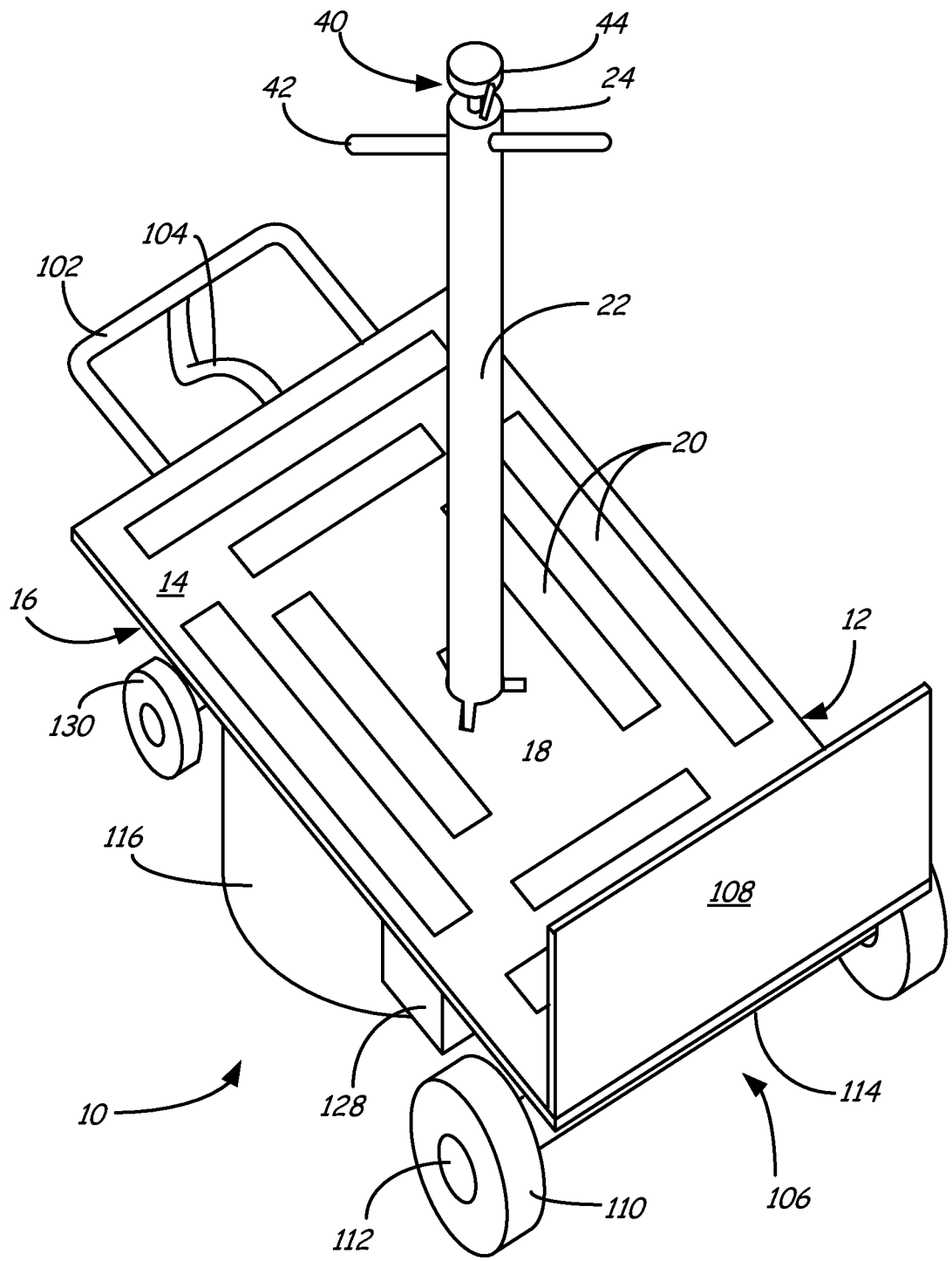
FIG. 1 is a perspective view of an embodiment of the device.

With reference to FIG. 1, seisgun device 10 is shown. Device 10 comprises a platform 12 having an upper surface 14 and a lower surface 16. Platform 12 may be any type of resilient material, such as wood, fiberglass, or metal, and may be any thickness. Platform 12 is preferably optimized for weight and strength.

Located roughly centrally about platform 12 is an aperture 18. As will be shown, upper surface 14 of platform 12 serves as the firing platform where one or more operators will stand and thus should be smooth, durable, and adapted for sure footing. Optionally, upper surface 14 may feature non-skid material 20, which may be any tactile or coarse material such as conventional self-adhesive strips or non-slip tapes. Non-skid material 20 may be in any arrangement or pattern about platform 12, including radially about aperture 18 as well as perimetric.

Figure 2:
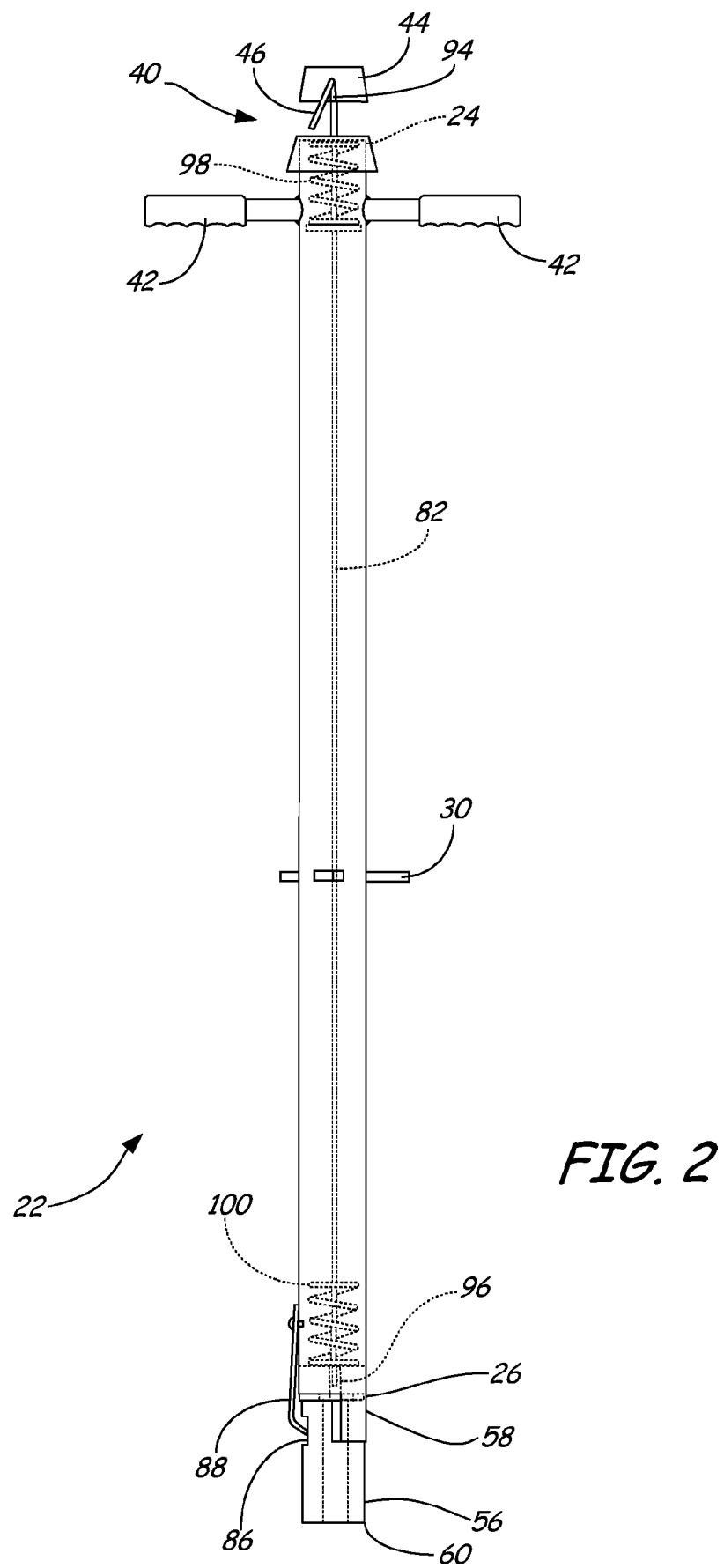
FIG. 2 is a cutaway view of certain elements of the device.
Figure 3:
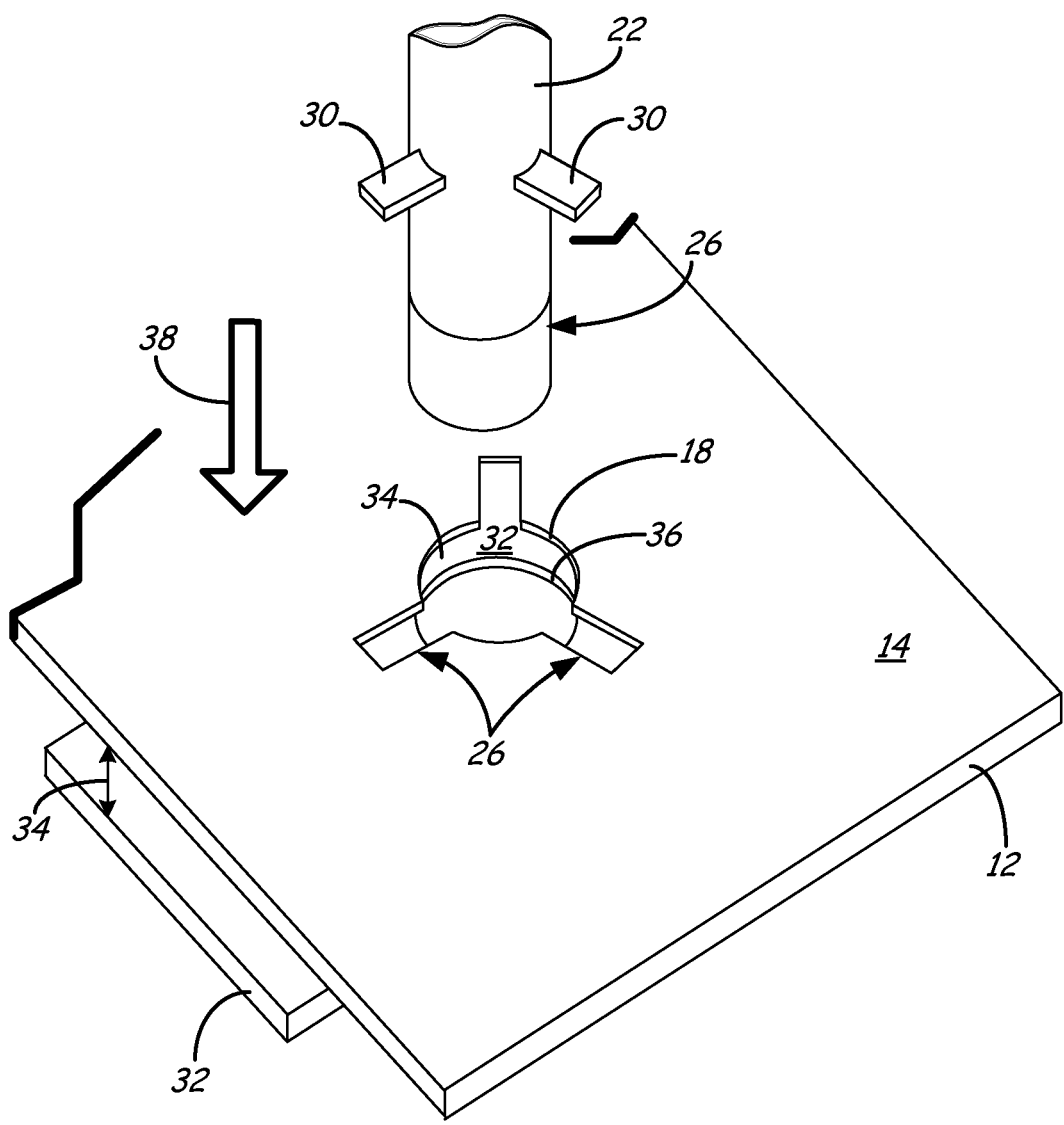
FIG. 3 is a partial perspective view of certain elements of the device.

Extending upward from platform 12, through aperture 18, is an elongate stock 22 having a first end 24 and a second end 26 (obscured in FIG. 1; see FIG. 2). As illustrated in FIG. 3, aperture 18 is preferably adapted to receive stock 22. For example, the outer diameter of stock 22 (or any protrusions thereon) may be slightly smaller than the inner diameter of the circular portion of aperture 18. Correspondingly, any protruding or surface features on stock 22 are reflected in the outline of aperture 18 and/or are otherwise accommodated by its inner diameter. In an exemplary embodiment shown in FIG. 3, aperture 18 is roughly circular with a plurality of spaced apart, substantially radial projections 26. Stock 22 has corresponding and complementary radial tabs 30. Still referring to FIG. 3, secondary platform 32 is below, in a parallel plane to and spaced apart from platform 12, defining an inter-platform space 34 therebetween. Secondary platform 32 is visible through aperture 18, as shown. A secondary aperture 36 is located roughly centrally about secondary platform 32, and corresponding roughly with the circular portion of aperture 18. Secondary aperture 36 is preferably circular and similar in size to aperture 18. Secondary aperture 36 preferably does not have any radial projections, which will be understood to restrict the downward travel of stock 22.

As will be appreciated, second end 26 of stock 22 is inserted downward (direction of arrow 32) into and through aperture 18. Tabs 30 line up with projections 28 of aperture 18. Second end 26 of stock 22 will pass through secondary aperture 36, but tabs 30 will not. Upon insertion, stock 22 may be rotated partially within inter-platform space 34 such that tabs 30 are no longer aligned with projections 28, thereby preventing upward movement of stock 22 (opposite arrow 32) relative to platform 12 and thus retaining stock 22 in its vertical, upright position (FIG. 1). Likewise, in order to remove stock 22 from platform 12, stock 22 is rotated in an opposite direction within inter-platform space 34 until tabs 30 align with projections 28 and then lifted until clear.

Referring back to FIG. 2, first end 24 of stock 22 further comprises a firing mechanism 40 and at least one hand grip 42. A pair of hand grips 42 perpendicularly opposed about stock 22 are preferred. Hand grips 42 aid in the rotation, insertion and removal of stock 22 as described above.

Figure 4:
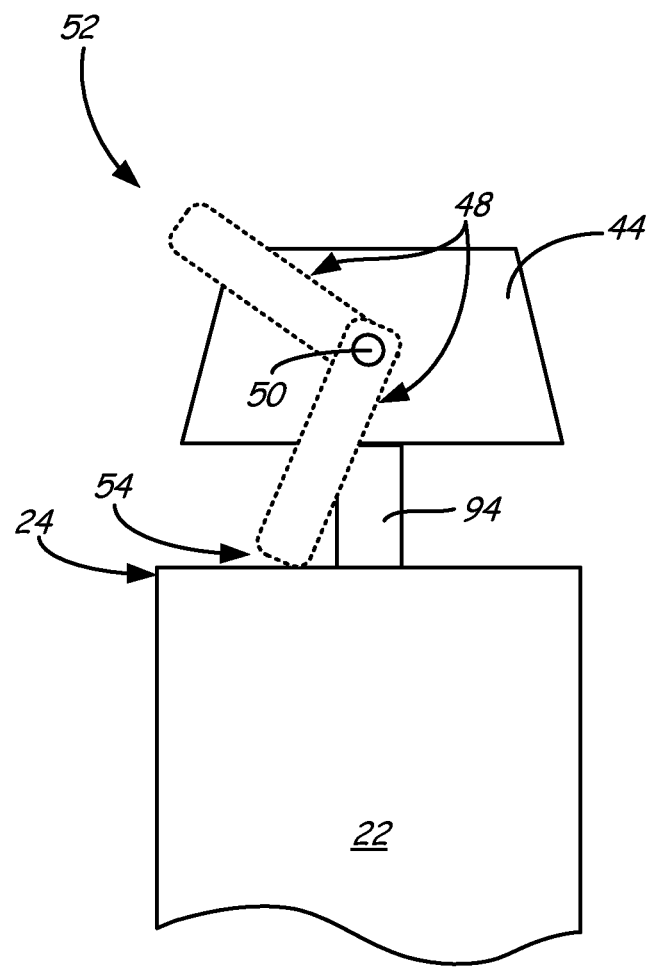
FIG. 4 is a partial side view of certain elements of the device.

Firing mechanism 40 further comprises a trigger 44. Trigger 44 is actuated by pressing it down. Optionally, firing mechanism comprises a safety 46. Safety 46 may be any interlock or device capable of preventing the actuation of trigger 44. In the exemplary embodiment depicted in FIG. 4, safety 46 comprises a member 48 that pivots about a pin 50 between a "fire" position 52 and a "safe" position 54. In "safe" position 54, member 48 frictionally engages both trigger 44 and first end 24 of stock 22, thereby preventing trigger 44 from being depressed.

Figure 5:
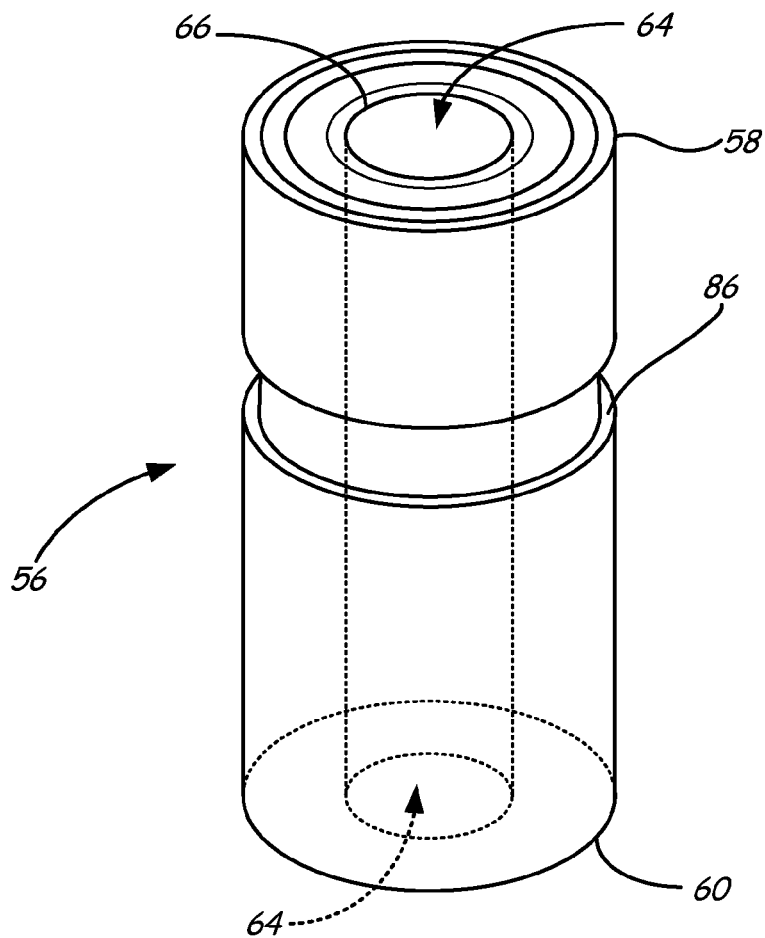
FIG. 5/ is perspective view of an element of the device.

Referring back to FIG. 2, second end 26 of stock 22 further comprises a substantially cylindrical barrel 56 having a breech end 58 opposite a discharge end 6o. Barrel 56 is detachably secured to stock 22, as will be further discussed below. Breech end 58 is proximate second end 26 of stock 22. As shown in FIG. 5, breech end 58 further comprises an annular seal 62, such as an o-ring, that engages second end 26 of stock 22.

Barrel 56, preferably made of a sturdy, corrosion resistant material such as stainless steel, also comprises a centrally disposed, cylindrical channel (chamber) 64 disposed between the breech end 58 and discharge end 60. The opening of chamber 64 at breech end 58 may also comprise an annular shelf 66.

Figure 6:
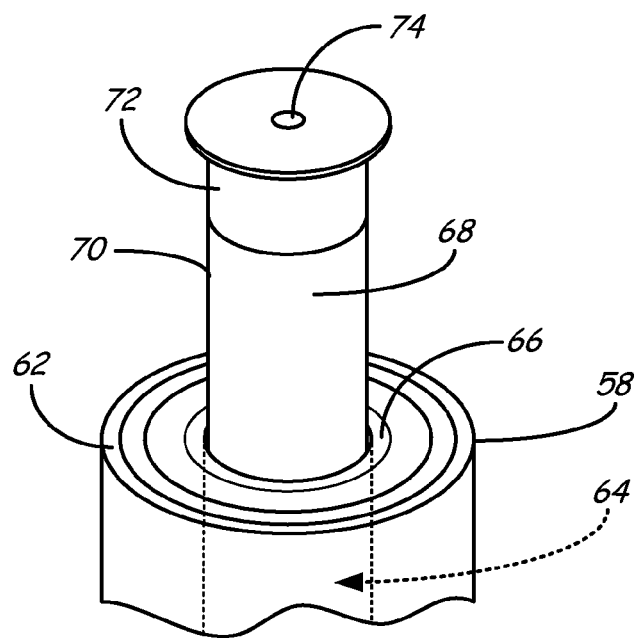
FIG. 6 is a partial perspective view of an element of the device.

Turning to FIG. 6, chamber 64 is adapted to receive ammunition 68 such as a standard shotgun slug shell. Device 10 preferably has only a single-shot capacity, which will be appreciated to maximize safety to the operator as well as bystanders. As is well known in the art, and as illustrated in FIG. 6, conventional shotgun ammunition 68 comprises a shell case 70, a rimmed brass cap 72, and a primer 74 centrally located about the cap 72, as well as gunpowder, wadding and the shot or slug disposed within shell case 70 (not shown). The primer 74, upon being struck by a firing pin, explodes and ignites the gunpowder. The powder in turn burns and creates gas to propel the wadding and shot/slug forward. The wadding seals the gas behind the shot/slug.

It will be appreciated that the diameter of chamber 64 must correspond to the diameter of ammunition 68 (e.g., shell case) to be used. In order to retain the ammunition, the diameter of chamber 64 at breech end 58 must also be smaller than the diameter of the rim about the cap 72 of the shell 68. Optionally, the rim of cap 72 may rest on annular shelf 66.

Device 10 is adapted to be used with different gauge ammunition 68. As is known in the art, ammunition 68 may vary in terms of both length and diameter, which might necessitate changes in the internal dimensions of chamber 64. This may be accomplished by using a universal barrel 56, or by using interchangeable, gauge-specific barrels 56, 56'. For example, barrel 56 may be adapted for conventional 12 ga. ammunition 68, while a different barrel 56' may be adapted for conventional 8 ga. ammunition 68'.

In order to accommodate interchangeability, second end 26 of stock 22 is adapted to releasably receive a barrel 56. Barrel 56 may be retained frictionally and/or using any number of securing devices such as clamps, brackets or clips. Alternatively, the outer surface of barrel 56 and inner surface of second end 26 of stock 22 may be complementarily threaded. Regardless of the mechanism selected, interchangeability preferably permits the fast, convenient swapping of barrels 56, 56' in the field and without tools or using only very simple hand tools.

Figure 7:
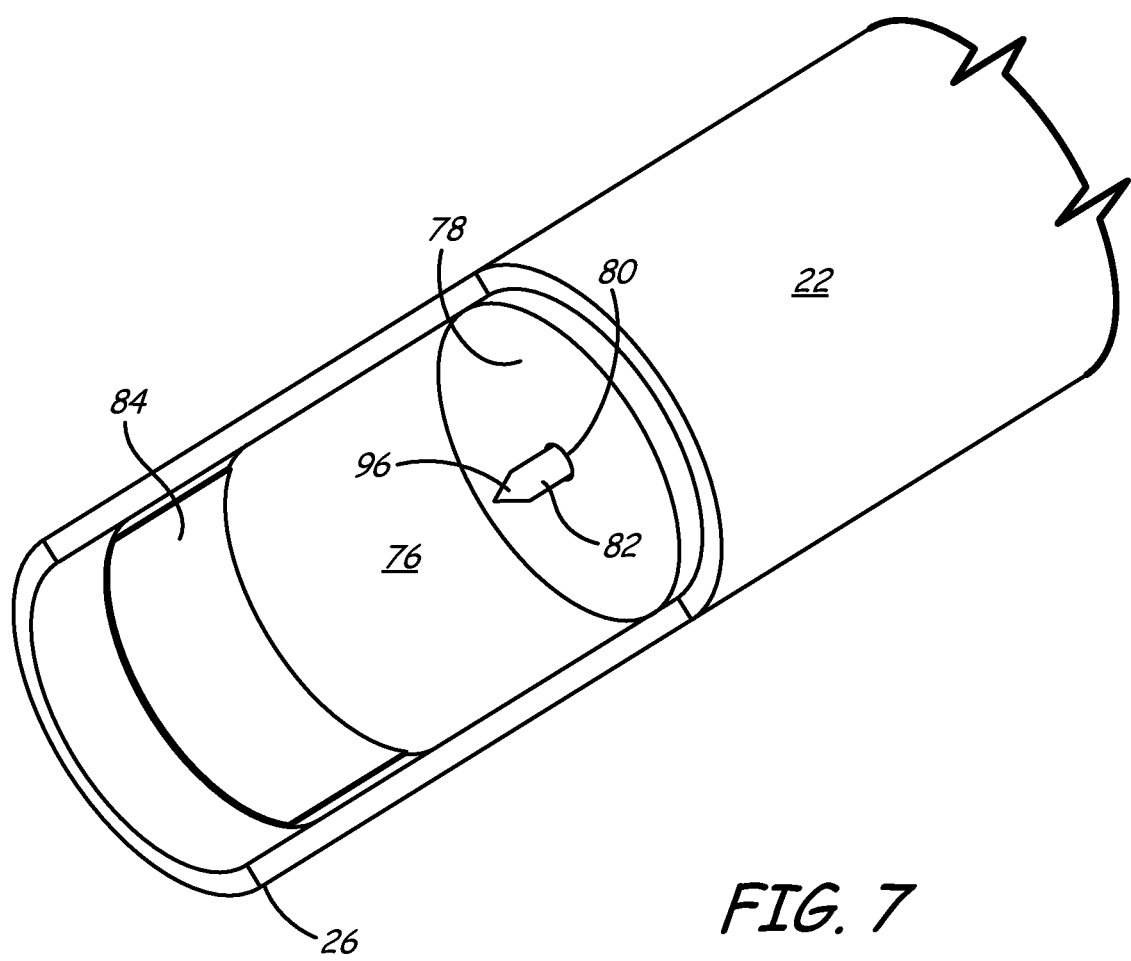
FIG. 7 is a partial perspective view of an element of the device.

In an exemplary embodiment shown in FIG. 7, approximately one half of second end 26 of stock 22 is notched out, thereby defining a receiving area 76. At one end of receiving area 76 is breech (breech face) 78. Centrally located about breech 78 is the aperture 80 through which firing pin 82 (only partially shown) extends upon the actuation of trigger 44 (FIG. 7 shows the position of firing pin 82 during actuation of trigger 44). Between breech 78 and second end 26 is a raised surface 84. Turning back to FIG. 5, barrel 56 may also comprise a circumferential groove 86. It will be appreciated that groove 86 corresponds with and is complementary to raised surface 84.

Figure 8:
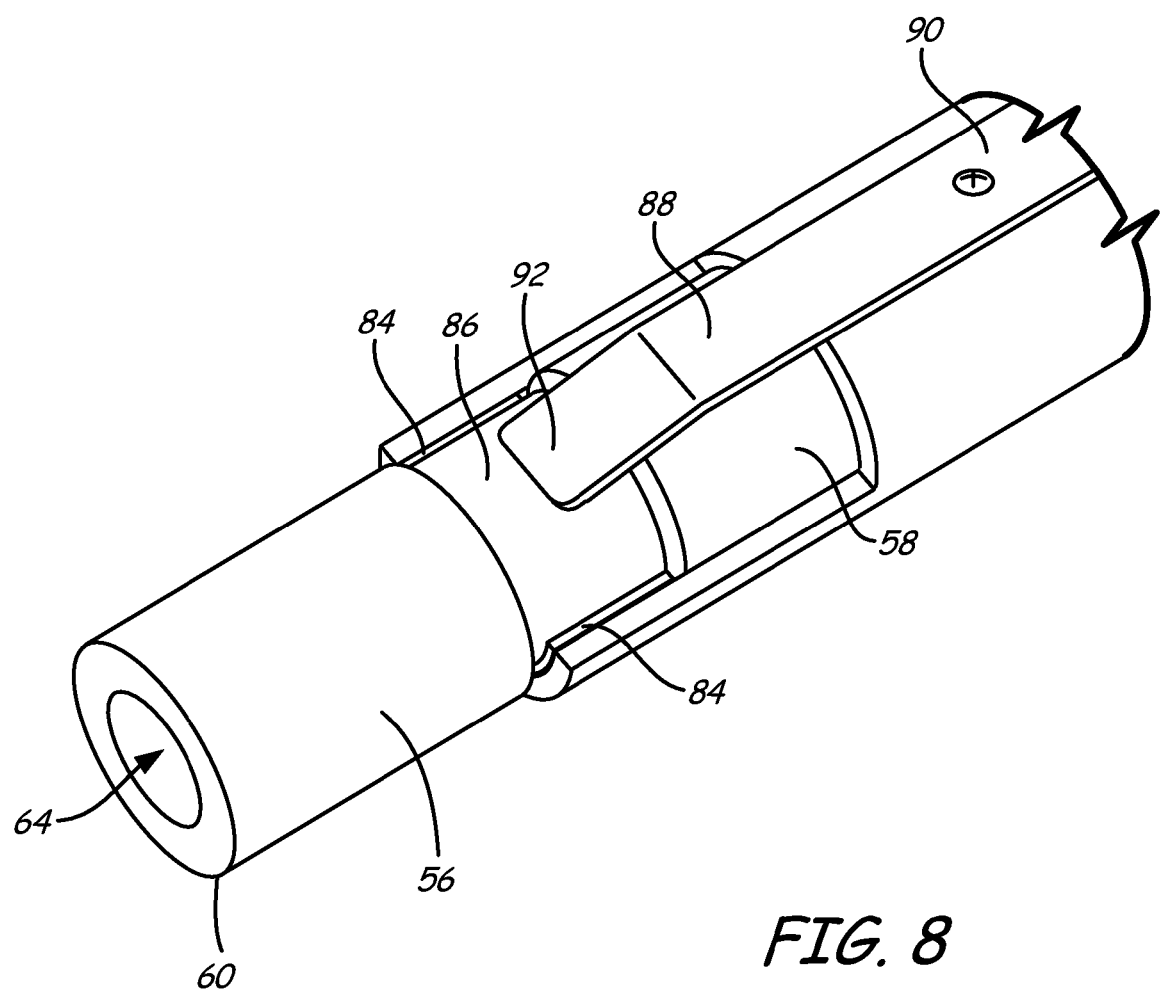
FIG. 8 is a partial perspective view of certain elements of the device.

Because of the notch out in second end 26 of stock 22, barrel 56 may slide directly down into receiving area 76 by lining up breech end 58 with breech 82, and by lining up groove 86 with raised surface 84. It will be appreciated that barrel 56 may not be inserted into receiving area 76 while trigger 44 is actuated. In yet another embodiment shown in FIG. 8, barrel 56 is frictionally retained in receiving area 76 by an angular locking bar 88 that is secured under tension at a first end 90 to stock 22 (such as by a fastener) and engages at a second end 92 under tension with circumferential groove 86 about barrel 56.

Turning back to FIG. 2, an elongate firing pin (rod) 82 is disposed between firing mechanism 40 and barrel 56, preferably centrally within the length of stock 22. Firing rod 82 comprises a proximal end 94 (see also FIG. 4) and a distal end 96 (see also FIG. 7). Proximal end 94 is retained by a first spring 98 and is in physical communication with trigger 44 such that when spring 98 is at rest, trigger 44 is raised up and ready to receive a downward force. Distal end 96 is retained by a second spring 100 and when spring 100 is at rest, distal end 96 is suspended behind breech 78 (over the primer 74 of ammunition 68, when device is loaded).

Figure 9:
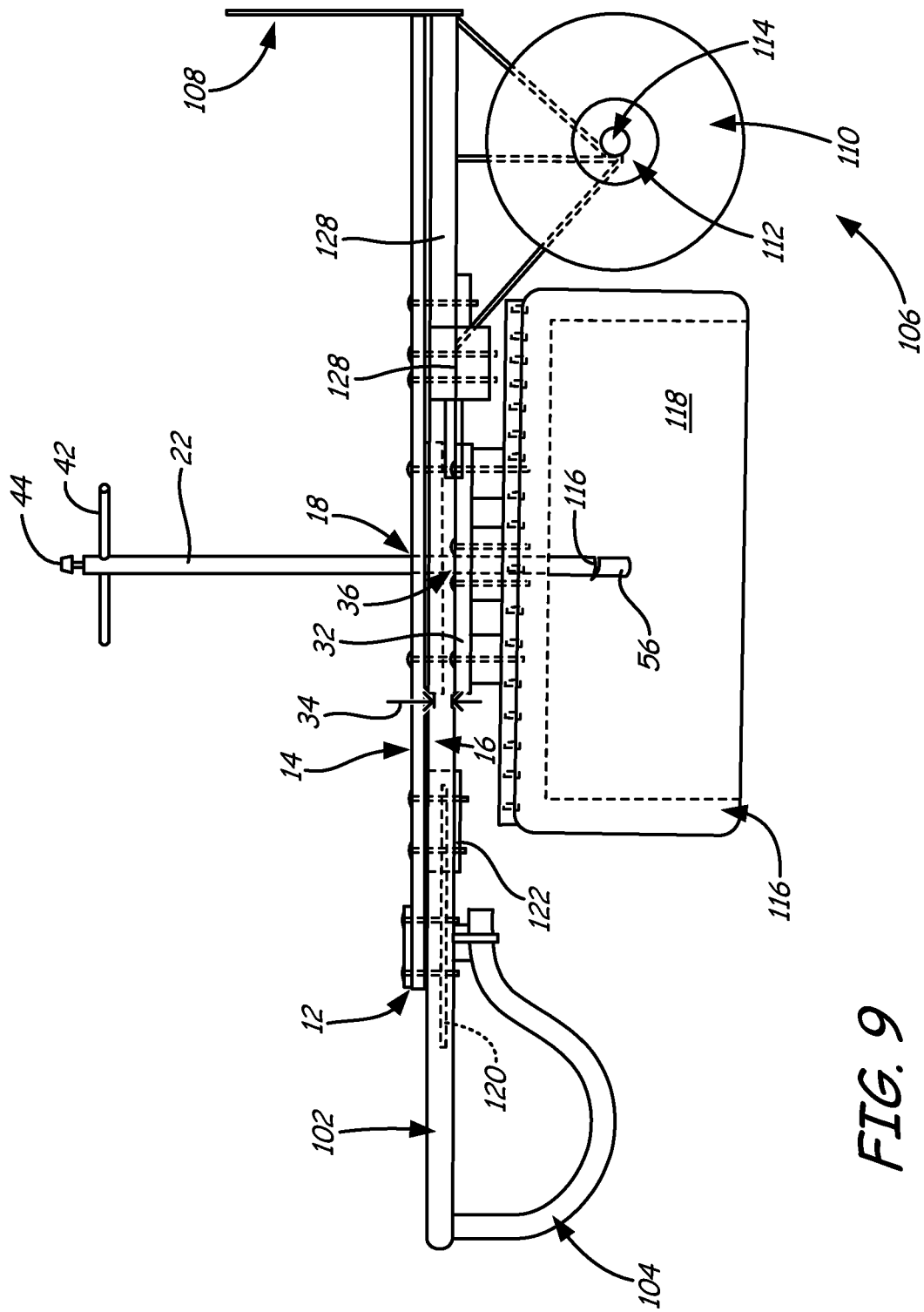
FIG. 9 is a cutaway view of an embodiment of the device.

As shown in FIGS. 1 and 9, lower surface 16 of platform 12 is secured to a longitudinal support frame 102. Support frame 102 preferably comprises a handle portion 104 at one end, a wheel assembly 106 opposite said handle portion 104, and a base plate 108 that is substantially perpendicular to both platform 12 and support frame 102. Preferably, wheel assembly 106 is opposite base plate 108 and comprises two, inflatable tires no mounted on wheels 112 about a single axle 114. By way of example, support frame 102 could be a conventional hand truck, hand cart or hand dolly. As is well known in the art, hand trucks have perpendicular base plates that are mounted on the support frame opposite of the wheel assembly. It should be appreciated that the present disclosure includes a useful method for the conversion of an existing hand truck into a seismic shotgun device as described herein, as well as a kit for facilitating the same.

A skirt 116 is disposed below secondary platform 32, proximate secondary aperture 36. Skirt 116 is also secured to support frame 102. Skirt 116 may be any hollow structure but is preferably lightweight and capable of suppressing both sound as well as physical debris such as earth, vegetation or water. By way of example, skirt 116 could be an automobile tire. Optionally, the interior surface of skirt 116 may further comprise a shock and/or sound deadening and/or dampening substance such as spray-on foam, insulation or the like.

Still referring to FIG. 9, it will be appreciated that the depth of penetration of second end 26 of stock 22 should be sufficient so as to dispose barrel 56 within the space 118 defined by skirt 116. This will maximize the effectiveness of skirt 116 in containing both noise and debris.

Support frame 102 may be adapted to receive and releasably retain stock 22 when not in use for purposes of both storage and transportation. This adaptation may comprise one or more of the following: clamps, brackets, slots, grooves, channels, elastic members, recesses, hollowed-out portions, or any combination thereof. Furthermore, this adaptation may comprise physical modifications to the frame 102, separate elements affixed to frame 102 such as a receiving block 128 (having an upward-facing cylindrical recess for receiving second end 26 of stock 22), a clip 130 (for engaging stock 22 proximate first end 24) or both. See also FIG. 1.

Figure 10:
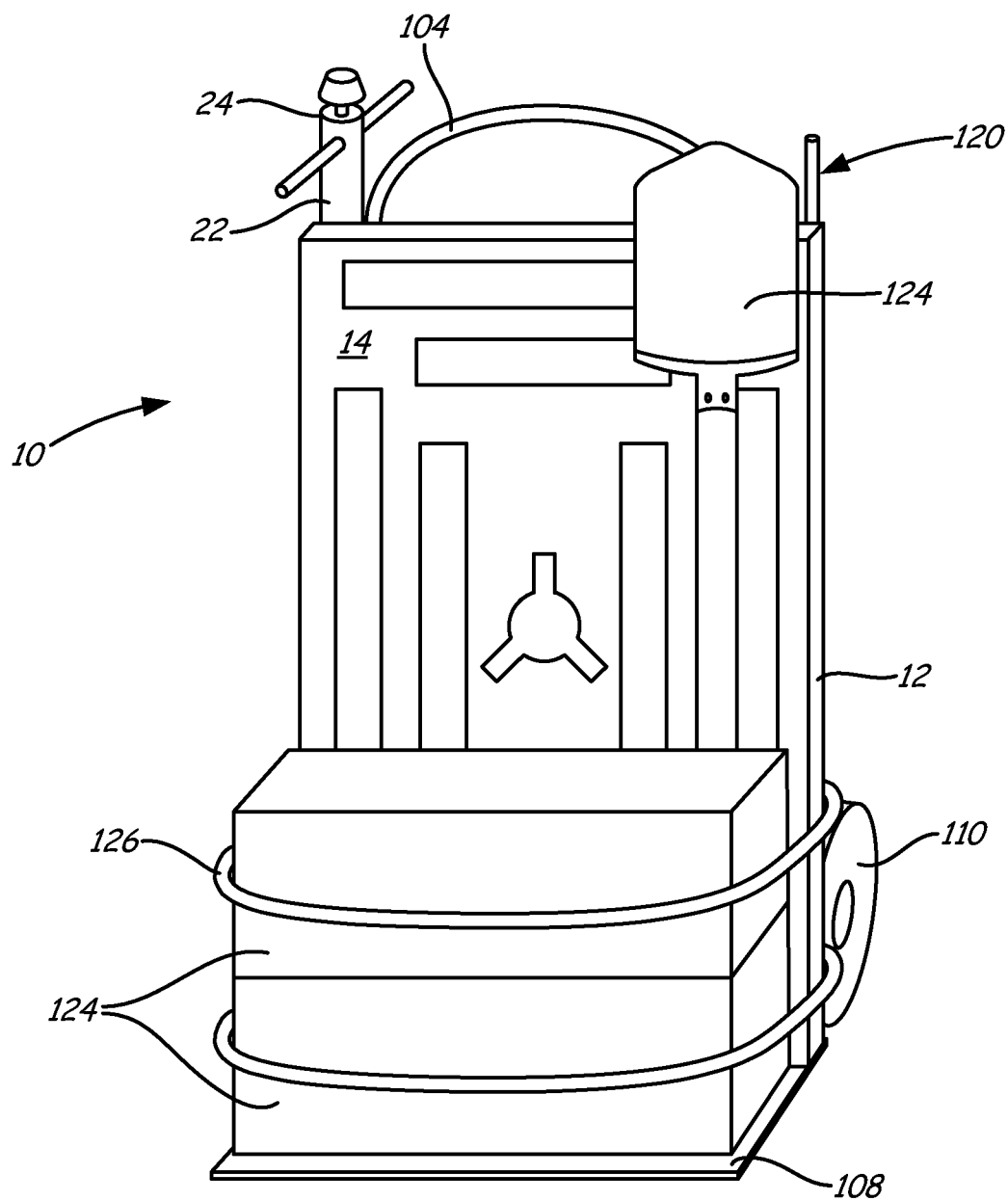
FIG. 10 is a perspective view of an embodiment of the device.

In any event, stock 22 is retained at the lower surface 16 of platform 12, and it will be appreciated that the upper surface 14 of platform 12 remains clear for receiving and transporting other cargo 124, such as measuring equipment, field gear or supplies, as illustrated in FIG. 10. Cargo 124 is also supported by base plate 108 and may be secured to device 10 via cargo straps 126, such as conventional bungee cords or the like. It will be appreciated that device 10, like many conventional hand trucks or dollies, may be transported over a variety of terrains, including unpaved and uneven surfaces. Given its configuration, device 10 is particularly well adapted for transport in a vertical or substantially vertical position.

Device 10 preferably comprises a shell removal tool 120 such as a rod. Tool 120 may be any elongated member capable of reaching into a spent ammunition shell 68 from discharge end 6o of barrel 56 and pushing shell 68 from chamber 64. In a preferred embodiment, support frame 102 is adapted to receive and releasably retain tool 120 such as by a holder, bracket, sleeve, clip, channel or other means 122 that provides ready access and convenient storage. Alternatively, tool 120 may be fixed and stationary, which would require the user to place discharge end 6o of barrel 56 over tool 120 but would enable one-handed clearing of spent shells 68.

In an exemplary embodiment, the use and operation of seisgun device 10 is as follows. The operator transports seisgun device 10 to a desired location. Field gear and supplies may be strapped to platform 12, thereby maximizing portability. Locations are ordinarily prepared by digging a borehole; in many applications, a borehole having a depth of approximately 18 inches is appropriate. The desired ammunition type is selected based on parameters that are well known in the art. An exemplary type is a 12-gauge shotgun slug.

Device 10 is lowered into a horizontal position, and any cargo, gear or apparatus is removed. Stock 22 is removed from support frame 102. Ammunition 68 is inserted by sliding the live shell into breech end 58 of barrel 56 until the rim 70 of the shell 68 engages the outer surface of breech end 58. Barrel 56, maintained with discharge end 60 pointing downward so as to retain shell 68 in place, is attached to second end 26 of stock 22. Tabs 30 are aligned with projections 28, and second end 26 of stock 22 is then inserted downward into aperture 18 and rotated within inter-platform space 34. Safety 46 is disengaged and firing mechanism 40 is placed into fire position 52. When it is determined by the operator to be safe to do so, trigger 44 is actuated. Trigger 44 may be actuated by any means capable of delivering a downward force, such as a light mallet blow or even the palm of the user's hand.

Ammunition 68 (i.e., the shot or slug contained within the shell) is dispensed into the borehole, resulting in the desired seismic activity to be monitored using conventional surface and subsurface detection equipment. Following firing, safety 46 is engaged, rendering firing mechanism 40 in the safe position 54. Stock 22 is rotated in an opposite direction within inter-platform space 34 until tabs 3o are aligned with projections 28 of aperture 18. Stock 22 is lifted and removed from platform 12. Barrel 56 is removed form second end 26 of stock 22.

Persons skilled in the art will understand that the discharge of shotgun ammunition will frequently result in the malformation of the spent shell. An expanded or irregular shell may not slide out of chamber 56 as readily as it was inserted. By inserting removal tool 120 into discharge end 6o of barrel 56, spent ammunition 68 is removed. During transportation, stock 22 remains disengaged from device 10. Preferably, stock 22 is secured about support frame 102 in a manner as described above.

Whereas, the present invention has been described in relation to the drawings attached hereto, it should be understood that other and further modifications, apart from those shown or suggested herein, may be made within the spirit and scope of this invention.

I claim:

1. A seismic shotgun device, comprising:
a longitudinal support frame;
a platform mounted to said support frame, said platform having an upper surface, a lower surface, and an aperture;
a wheel assembly comprising at least one wheel mounted to said support frame;
a base plate proximate said wheel assembly, wherein said base plate is substantially perpendicular to said support frame;
an elongate stock detachably mounted to, and roughly perpendicular to, said platform, wherein said stock has a first and a second end;
wherein said aperture is adapted to receive said second end of said stock;
a firing mechanism at said first end of said stock;
a barrel detachably secured to said second end of said stock, said barrel adapted to receive ammunition;
a firing pin disposed between and in communication with said firing mechanism and said barrel;
and a skirt mounted to said lower surface of said platform, proximate said aperture.

2. The device of claim 1 wherein said base plate is opposite said wheel assembly.

3. The device of claim 2 wherein said support frame, wheel assembly and base plate comprise a preassembled, conventional hand truck.

4. The device of claim 1 wherein said aperture is roughly centrally located about said platform.

5. The device of claim 1 wherein said firing pin is disposed centrally within said stock.

6. The device of claim 1 wherein said firing mechanism further comprises a safety.

7. The device of claim 1 wherein said upper surface of said platform further comprises a non-skid material proximate said aperture.

8. The device of claim 1 wherein said wheel assembly comprises an axle and a tire and wheel at each end of said axle.

9. The device of claim 1, further comprising means for releasably mounting said stock to said lower surface of said platform.

10. The device of claim 1 comprising a plurality of barrels each adapted to receive a different type of ammunition.

11. The device of claim 1 wherein said skirt completely encircles the space beneath said aperture.

12. A seismic shotgun device, comprising:
a conventional hand truck, said hand truck comprising a longitudinal support frame, a wheel assembly, and a base plate opposite said wheel assembly and roughly perpendicular to said support frame;

a platform having an upper surface, a lower surface and an aperture, wherein said lower surface of said platform is mounted to said support frame;

an elongate stock having a first end and a second end, said stock detachably and roughly perpendicularly mounted to said platform, wherein said stock is disposed within said aperture;

a firing mechanism at said first end of said stock;

a barrel detachably secured to said second end of said stock, said barrel adapted to receive ammunition;

a firing pin disposed between said firing mechanism and said barrel;

wherein said platform and said base plate are adapted to transport cargo when said device is not in use; and means for releasably mounting said stock to said lower surface of said platform.

13. A method for constructing a seismic shotgun device, comprising the steps of:

providing a preassembled, conventional hand truck having a longitudinal support frame, a wheel assembly, and a base plate that is substantially perpendicular to said support frame;

mounting a platform to said support frame, said platform having an upper surface, a lower surface, and an aperture;

detachably mounting an elongate stock to, and roughly perpendicular to, said platform, wherein said stock has a first and a second end;

adapting said aperture to receive said second end of said stock;

providing a firing mechanism at said first end of said stock;

detachably securing a barrel to said second end of said stock, said barrel adapted to receive ammunition;

disposing a firing pin between and in communication with said firing mechanism and said barrel;

and mounting a skirt to said lower surface of said platform, proximate said aperture.

* * * * *